United States Patent [19]

Adams et al.

[11] 3,932,903

[45] Jan. 20, 1976

[54] GUARD INCLUDING ELECTRICAL CONTROLS AND SLIDABLE UNDERNEATH THE BED

[75] Inventors: James S. Adams, Batesville; Leslie Dale Foster, Brookville; William H. Peck, Batesville, all of Ind.

[73] Assignee: Hill-Rom Company, Inc., Batesville, Ind.

[22] Filed: Oct. 4, 1974

[21] Appl. No.: 512,312

[52] U.S. Cl. .............................. 5/100; 5/63; 318/65
[51] Int. Cl.² .................... A47D 09/00; H02P 07/74
[58] Field of Search ........... 5/100, 331; 318/65, 103

[56] References Cited

UNITED STATES PATENTS

| | | | |
|---|---|---|---|
| 3,081,463 | 3/1963 | Williams et al. | 5/331 |
| 3,220,024 | 11/1965 | Nelson | 5/331 |
| 3,419,922 | 1/1969 | Malherbe | 5/331 |
| 3,585,659 | 6/1971 | Burst et al. | 5/331 |
| 3,742,527 | 7/1973 | Johnston | 5/68 |
| 3,839,753 | 10/1974 | Benoit et al. | 5/68 |

*Primary Examiner*—Casmir A. Nunberg
*Attorney, Agent, or Firm*—Robert V. Jambor

[57] ABSTRACT

Bed guard rotatable between elevated and lowered positions and slidable from the latter to a position underneath the bed. While elevated, it prevents accidental falling off, and when underneath, it allows facile patient management and movement of the bed through narrow passageways. Where the bed incorporates one or more electric motors to alter its configuration, the guard may additionally or alternatively include the patient controls for the motors.

11 Claims, 9 Drawing Figures

Fig 6
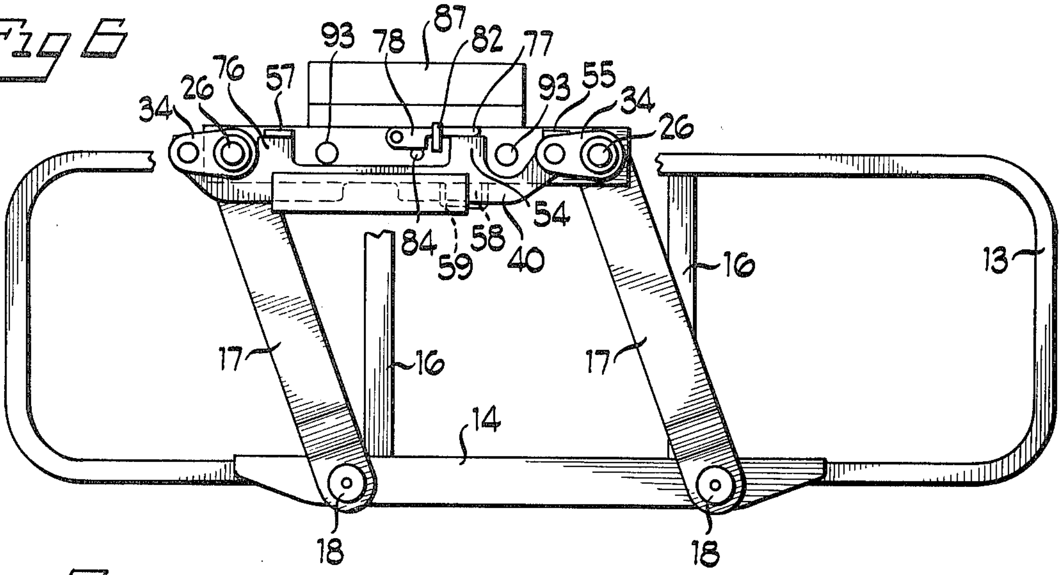
Fig 7
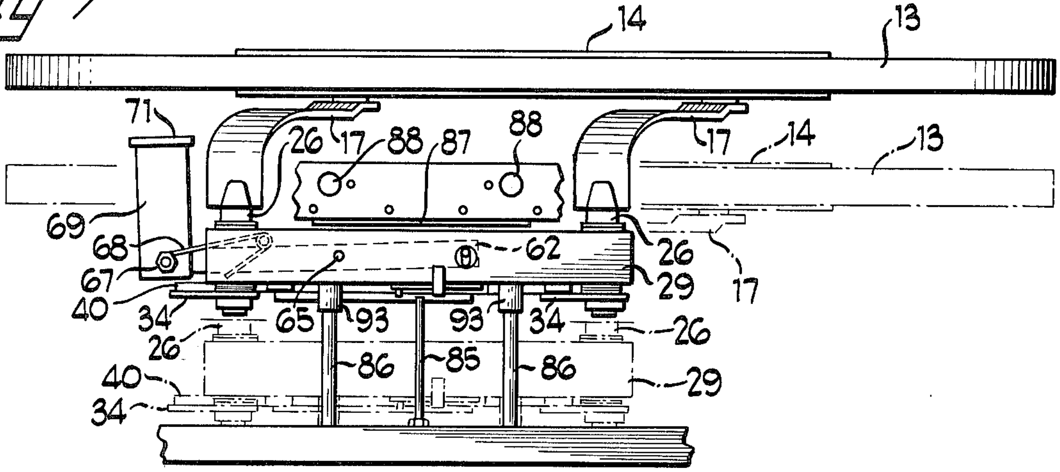
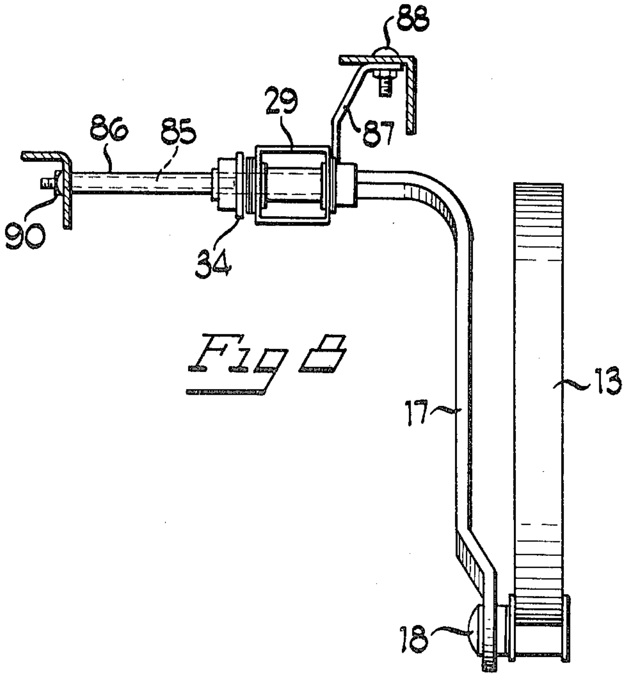
Fig 8
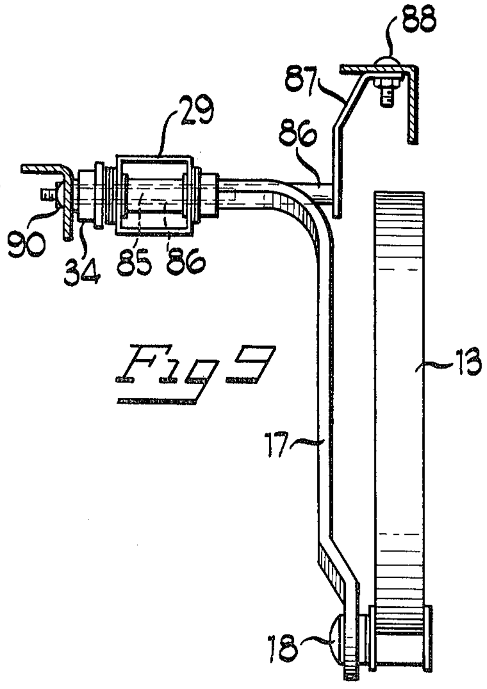
Fig 9

GUARD INCLUDING ELECTRICAL CONTROLS AND SLIDABLE UNDERNEATH THE BED

BACKGROUND

Side guards on a hospital bed serve the important function of keeping a patient from accidentally falling off the bed. This function assumes increased significance from the fact that this type of mishap represents one of the largest sources of injuries to hospitalized persons.

However, when in an elevated position to prevent accidental egress, the guards interfere with the patient's movement, care by others, and general bed maintenance. Accordingly, modern guards include some mechanisms to allow them to lower out of their guarding position while remaining attached to the bed.

The guards in their lowered position, though, present two problems. First, they offer no inducement to return them to their elevated position where they can again guard the patient.

Second, in most instances, the lowered guard extends beyond the outer perimeter of the mattress and its support. There it inteferes with the facile movement of the bed to different locations.

In an effort to ameliorate the latter problem, T. Nelson, in his U.S. Pat. No. 3,220,024, shows a side-guard structure which extends no further than the outer perimeter of the bed frame. However, the frame itself extends beyond the mattress and thus, would hinder the bed's movement.

U.S. Pat. No. 3,081,463 to R. J. Williams et al. shows a side quard which, upon lowering, swings out and then under the bed where a separate latching mechanism holds it. However, swinging the guard between positions requires a significant clear space on each side of the bed, thus reducing its practicability in a crowded hospital room. Moreover, the structure includes complicated mechanisms to swing the guard and retain it under the bed.

A. J. Higgins' U.S. Pat. No. 3,093,839 and C. B. Hutt's U.S. Pat. No. 3,234,570 indicate the desirability of an intermediate position for the guard somewhat elevated above its lowered location. Both of these patents, though, accomplish this additional configuration through the use of a collapsible side guard. A collapsing structure clearly presents significant dangers to fingers and other appendages.

Beds having one or more electric motors also include a set of controls accessible to the patient to allow him to alter its configuration. These may have a separate, rigid supporting structure or dangle from a cord as in U.S. Pat. No. 3,602,784 to G. M. Euler. The former represents a further barrier to using or attending to the bed while the latter allows the controls to become lost or even a menace to the patient.

SUMMARY

A guard structure for a bed typically includes body-restraining means to keep the occupant from falling off the bed. This restraining device can move between an elevated and a lowered position.

Retaining means, coupled to this body-restraining device, serves to hold the body retainer in its elevated configuration. Lastly, the structure must include release means to disengage the retaining means and allow the guard to lower.

Once in its lowered position, an advantageously improved guard structure results if the guard, or the body restraining means, may then move underneath the bed. Accordingly, it must have some means to permit the guard to move from its outer position to an inner position toward the center of the bed and under the mattress. To keep the guard from scraping the mattress and its support, the moving mechanism should also prevent the guard, unless substantially at its lowered position, from approaching closer to the mattress than a predesignated point. To avoid needless free play, the guard should remain at its outer limit until reaching the lowered position.

At times, the guard need only lower a portion of its vertical range to allow care of the patient as well as his ingress or egress. To achieve this for a rigid guard, its supporting structure may include a latch which will hold it in a partially elevated position.

Frequently a hospital bed with a guard structure also includes patient-controlled electrical facilities, such as a motor. Several important advantages result from the placement of the patient controls within the guard itself.

First, without a separate structure, the controls will not impede patient or bed care. Further, the embedding of the controls avoids the hazards of a dangling wire. Placed on the guard, the controls remain readily available, and do not become lost.

Moreover, in order for the patient to activate the controls, the guard must raise to an elevated position where the patient can reach them. Accordingly, they encourage the returning of a lowered guard to its elevated position. By doing so, they help reduce accidental falls from the bed.

BRIEF DESCRIPTION OF THE FIGURES

FIG. 6 has a rear elevational view of a guard in its lowered position;

FIG. 7 gives a top view of the guard in its lowered position, with the phantom drawing showing the guard in its recessed position underneath a bed;

FIG. 8 gives a side view of the guard in its lowered and extended position prior to sliding it under the bed; and FIG. 9 shows a side view of the guard in its lowered and recessed position.

DETAILED DESCRIPTION

Figure 1:
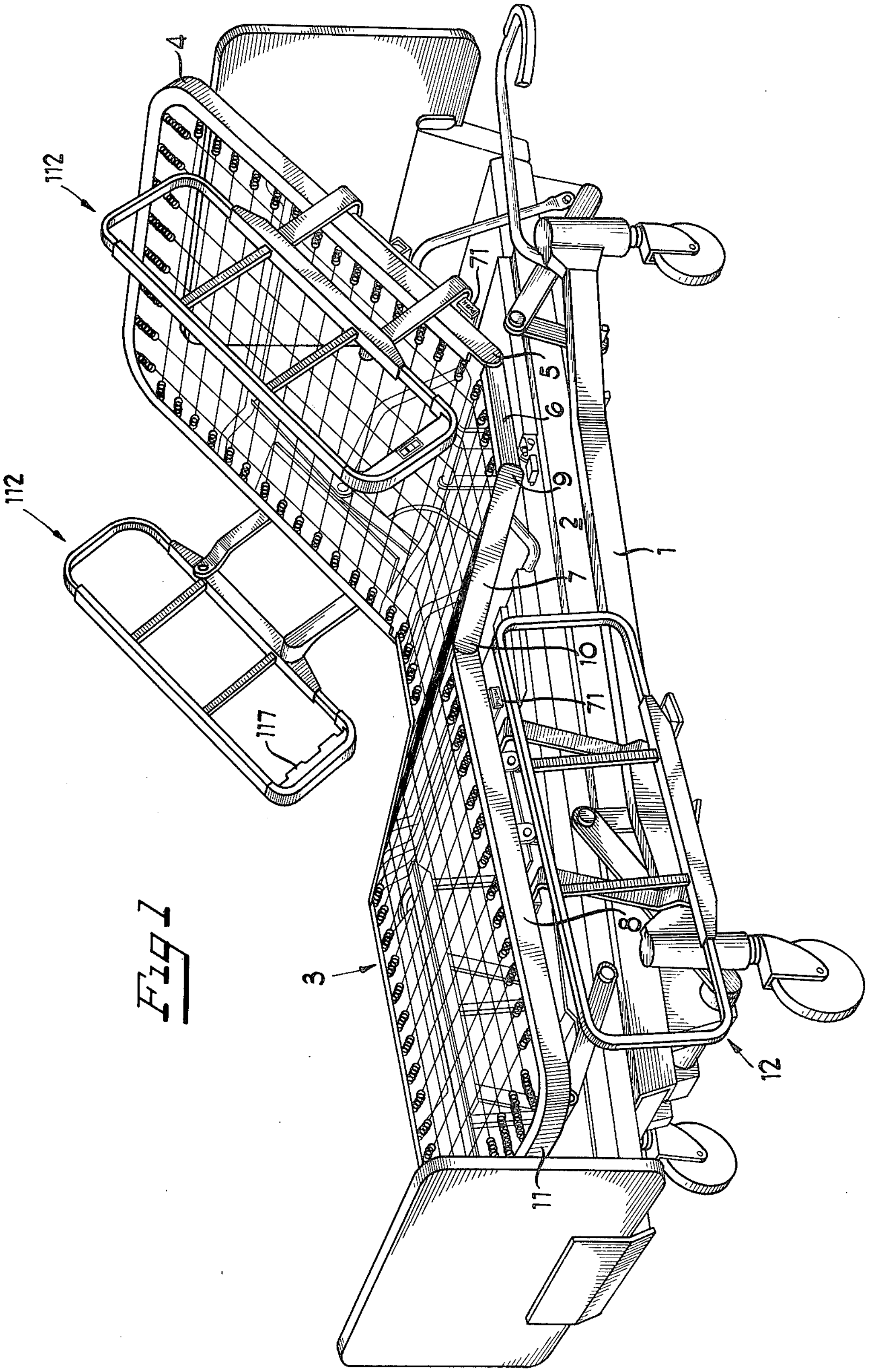
FIG. 1 shows a bed having guards containing electrical controls and slidable under the bed.

The bed in FIG. 1 includes adjustable portions in their configured or contoured positions. Many of them have become standard for hospital and nursing home beds.

The bed has a base frame 1 supporting it on the floor. The elevating frame 2 incorporates the structure that allows the bed to rise, descend, or tilt and also supports the remaining components at the chosen elevation.

The bed further has a segmented spring, indicated generally at 3, with a mesh or other structure to support a mattress. The segmentations in the spring allow it to assume the various configurations.

At one end of the bed appears the head portion 4 of the spring. It pivots about an axis through the point 5 to elevate the patient's head.

U.S. Pat. No. 3,237,212 to W. A. Hillenbrand et al. shows a vastly superior head elevating mechanism which moves the bed towards its head as the latter raises. This allows the patient's head to remain near the wall and the usual auxiliary equipment.

The middle section 6 connects to the head portion 4 at the point 5. It remains fixed to the frame and generally displays no independent motion.

The knee portion of the bed consists of a thigh segment 7 and a foot segment 8. The former connects to the middle section 6 at the point 9 about which it rotates to elevate the thigh.

The foot section 8 pivotally connects to the thigh section 7 at the point 10. Rotation about the point allows for the flexing of the patient's knee. Upon raising the knee, the end 11 of the foot section may elevate slightly, as shown for added comfort.

Figure 2:
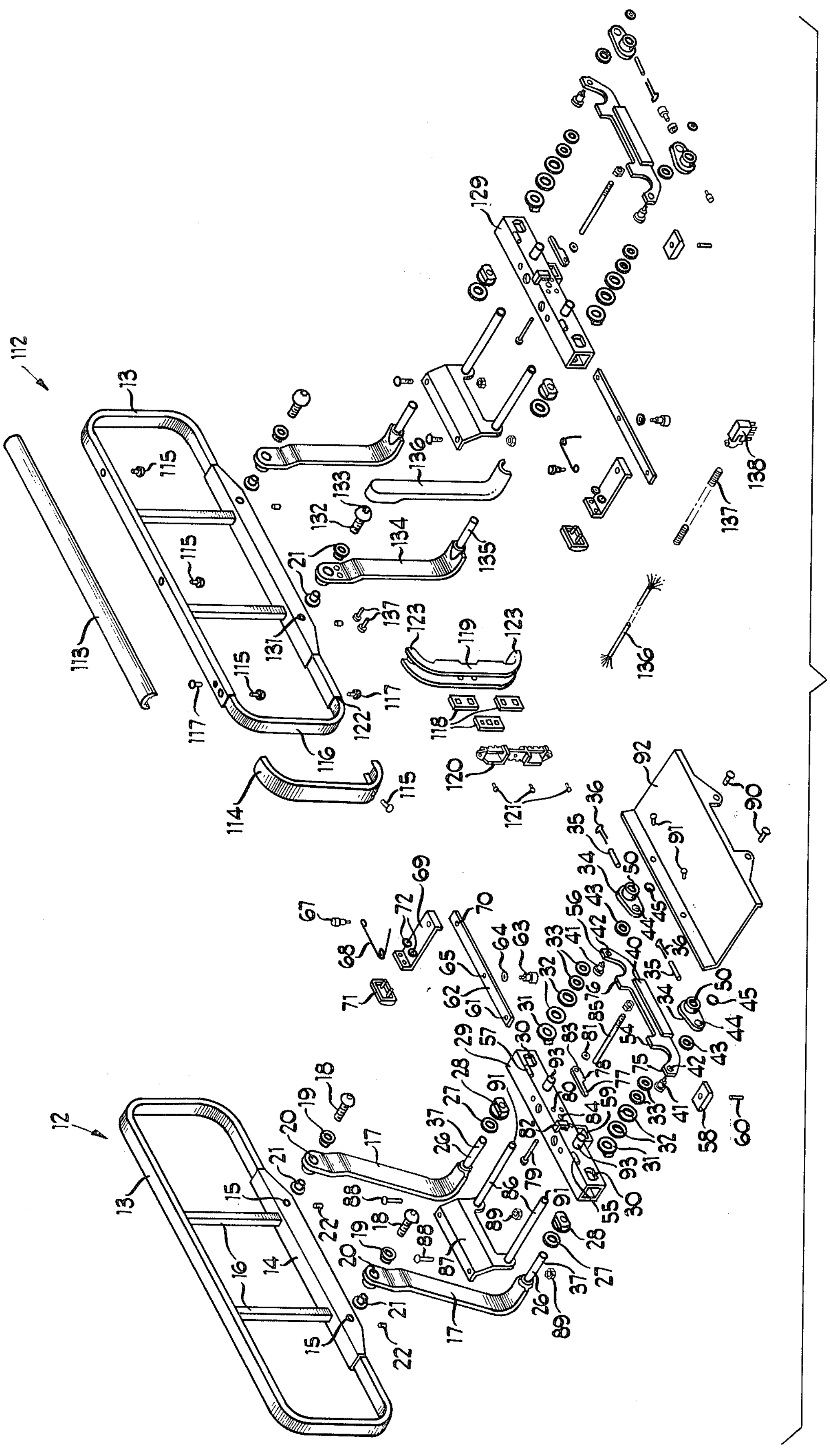
FIG. 2 gives an exploded view of a guard with and without embedded electrical controls.

The exploded view of FIG. 2 shows the parts of a foot guard 12 and without electrical controls and a head guard 112 with embedded controls. The guards in this figure appear on the right side of the bed or at the rear as viewed in FIG. 1. The guards in FIGS. 3 through 9 have comparable parts but appear on the bed's right or in the front of FIG. 1.

The foot side guard, without control switches, appears generally at 12 and includes the side guard rail 13 which forms a loop. The ends of the loop 13 terminate inside of the channel 14 and extend approximately up to the bushing 15. Welded between the loop 13 and the channel 14, the uprights 16 lend stability to the structure and also prevent patient egress through the guard 12

The side guard 12 attaches to the side-guard arms 17 by the pivot bolts 18 which pass through bearings 19, the arm bushings 20, which form part of the arms 17, and the further set of bushings 21. The bolts 18 then screw into the threaded bushing 15. When assembled, the bushings 19 and 21 actually fit within the arm bushing 20. Preferably they are made from sintered bronze impregnated with oil to lubricate the relative motions. The screws 22 lock the pivot bolts 18 into their preset positions inside the bushing 15 after an adjustment of pivot bolts 18 to remove any free play of the guard 12.

The pivot pins 26, welded to the pivot arms 17, pass through the washer 27, the bearings 28 and the frame 29 via the openings 30. After exiting the holes 30, the pivot pins 26 then pass through the plastic bearings 31, the spacers 32, and as many shim washers 33 as required to take up any remaining space.

The timing arms 34 fit over the distal ends of the pivot pins 26 where the tubular pins 35 hold them in place. The cotter pins 36 pass through the tubular pins 35 and, after passing through the openings 37, hold the tubular pins 35 inside the pivot pins 26.

The timing arms 34 pivotally attach to the timing link 40 by the rivets 41. These rivets pass through the openings 42 in the timing link 40; the shim washers 43; the holes 44 in the timing arms 34; and the washers 45 before having their ends swagged.

The guard 12 moves up and down through a circular motion. In so moving, the arms 17 also move in a circular fashion with the pivot pins 26 rotating about their center axis. Since the timing arms 34 rigidly attach to the pivot pins 26, they too will rotate about the center of their holes 50 which surround the pins 26. The rotation of the turning arms 34 causes their openings 44 to describe an arc. However, the inelastic timing link 40 connects the two turning arms 34 together. As a result, during any motion of the guard 12, they describe the same arc about their openings 50 with respect to each other.

In fact, the timing link 40 and the timing arms 34 specifically insure equal amounts of rotation of the pivot pins 26 and, hence, of the arms 17. This equal motion of the arms 17 results in the guard 12 remaining parallel to the section of the bed to which it attaches. Thus, in FIG. 1, the foot guard 12 has accompanied the foot section 8 as it has raised slightly. The head guards 112, which have the same mechanical structure as the foot guards, have clearly moved along with the head section 4 as the latter has raised. This coordinated motion with the mattress section keeps the guard in a position to provide its protection to the patient.

To go to its raised position, guard rail 12 rotates towards the head of the bed which in FIG. 2 proceeds by a clockwise motion. In FIGS. 3 through 9, the guard 12 moves in the counter-clockwise direction to elevate.

Because of its connection to the pivot pins 26 through the timing arms 34, the timing link 40 moves towards the foot of the bed as the guard 12 moves towards the head. Again in FIG. 2, this motion of the timing link 40 proceeds through a clockwise rotation, while in the later figures the link 40 moves counterclockwise as the guard 12 elevates.

The clockwise motion of the timing link 40 in FIG. 2 continues until the leg 54 on the timing link abuts the projection 55 on the frame 29, which occurs simultaneously with the leg 56 abutting the projection 57. The meeting of the legs 54 and 56 with the projections 55 and 57 limits the motion of the guard rail 12 towards the head of the bed and causes it to stop with the arms 17 slightly inclined towards the head.

Figure 3:
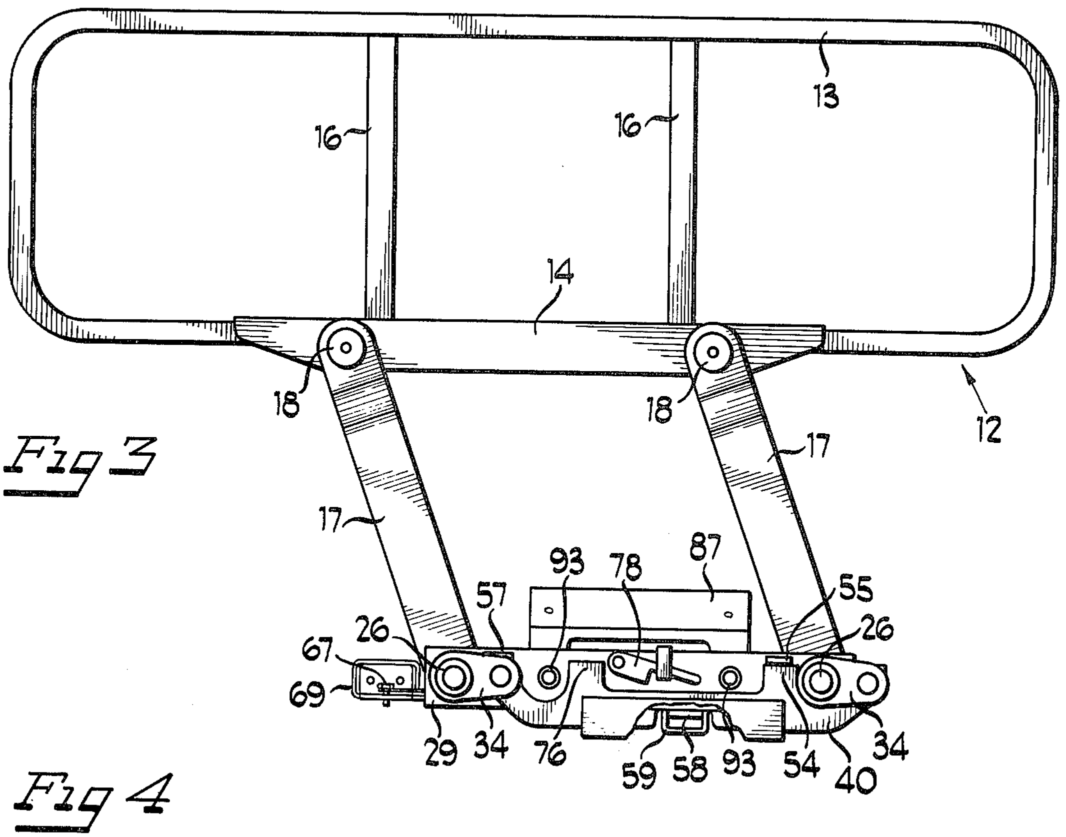
FIG. 3 has a rear elevational view of a guard structure not having controls and in its elevated position.
Figure 4:
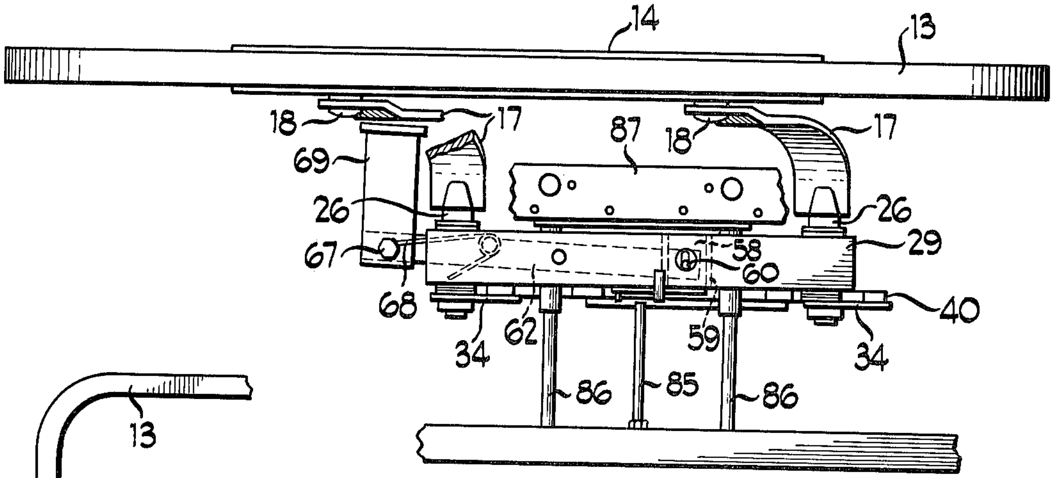
FIG. 4 gives a top view of the guard of FIG. 3 in the same elevated position.

At the same time, the latch 58, because of the elevation of the timing link 40 as it rotates, slides out from the latch housing 59, engages the underneath side of the timing link 40, and prevents it from rotating in a counterclockwise direction which would allow the guard 12 to descend. FIGS. 3 and 4 show the foot guard 12 in this elevated position. The arms 17 lean in the opposite direction from those in FIG. 2 since they appear on the opposite side of the bed. Nonetheless, they still incline toward the head of the bed.

The pin 60 extends through the latch 58 into the opening 61 of the latch arm 62. The arm 62 in turn pivotally attaches to the underside of the frame 29 by the shoulder bolt 63 which passes through the washer 64, the frame 29, and connects to the latch arm 62 at its opening 65.

At the open end of the arm 62, the shoulder bolt 67 passes through the latch return spring 68 and the actuation bracket 69 and attaches to the latch arm 61 at the opening 70. The latch return spring 68 fits within the frame 29 and forces the end of the latch arm 62 with the opening 70 towards the guard rail 12. The latch arm 62, accordingly, pivots about the point 65 and, acting through the pin 60, forces the latch 58 out of the housing 59 where the latter engages the underside of the timing link 40 to retain the guard rail 12 in its raised position.

Depressing the push button 71 releases the guard rail and allows it to descend. The button 71, attached to the bracket 69 by the push nut 72, pushes the bracket 69 and the latch arm 62 against the bias of the spring 68. The arm 62 pivots about the point 65 and retracts the latch 58 into the housing 59. With the latch 58 inside the housing 59, the link 40 may rotate towards the head of the bed or in a counterclockwise motion in FIG. 2.

The arms 17 will also rotate in the counter-clockwise direction, thus moving away from the push button 71 and the hand of the operator. All push buttons sit on the side of their guard rails where they will remain away from the path of the rotating guard arms.

Figure 5:
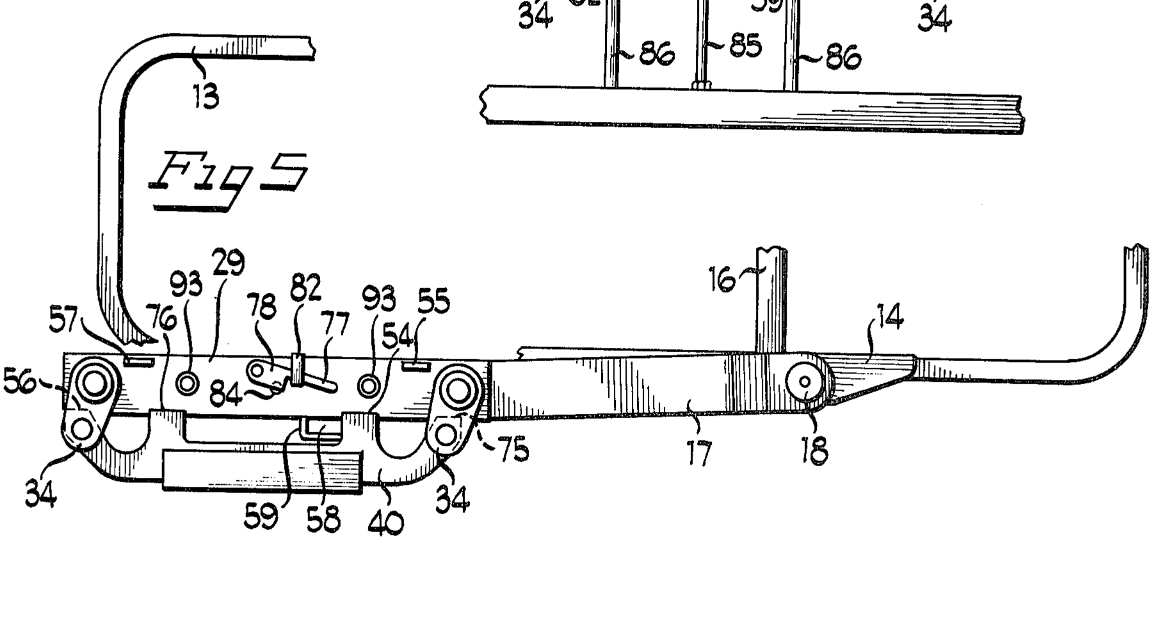
FIG. 5 gives a rear elevational view of a guard structure in its position of intermediate elevation.

After the timing link 40 has rotated slightly, it moves out of the way of the latch 58 which, due to the biasing of the latch spring 68, reemerges from the housing 59. After the guard rail 12 has descended approximately half of the permitted distance, the side of the leg 54 will abut against the side of the latch 58. This intermediate position allows for convenient patient care. FIG. 5 shows a foot guard held in the intermediate location.

Pressing again or still upon the release button 71, the latch 58 retracts into its housing 59, allowing the timing link 40 and, hence, the guard rail 12 to rotate in the counter-clockwise direction until the guard rail has reached its lowest position. At this point, the leg 75 abuts against the projection 55 on the frame 29 while the leg 76 rests against the projection 57.

Moreover, the leg 54 of the timing link 40 has engaged the narrow end 77 of the retracting latch 78. The latch 78 pivotally attaches to the frame 29 by the bolt 79 passing through the opening 80, while the push nut 81 holds it in place. The narrow end 77 of the retracting latch 78 sits within the loop 82 formed of steel welded to the frame 29. This loop 82 keeps the latch 78 in the generally correct position for its functionings. As the leg 54 forces up the end 77 of the latch 78, the wide part 83 of the latch 78 uncovers the opening 84 in the frame 29.

FIG. 6 shows the foot guard in its lowest position with the opening 84 in the frame 29 uncovered. Prior to its retraction underneath the bed, it occupies the position indicated both by the solid-line drawing in FIG. 7 and by FIG. 8.

The guard rail structure attaches to the bed frame at two locations. The support rods 86 attach to the bracket 87 which the bolts 88 and nuts 89 then hold to the bed. The bolts 90 pass through a member of the bed and screw into the threaded openings 91 of the other side of the support rods 86 to securely hold them to the bed. Bolts 90 as well as the bolts 91 also support the cover plate 92 in position. The support rods 86 pass through the openings 93 in the frame 29 in a sliding arrangement.

When the rail 12 reaches its lowest position, and the leg 54 uncovers the opening 84, the stop pin 85, attached to the bed, may enter the opening 84 as the frame 29 slides along the support rods 86. As the frame 29 passes over the support rods 86, it allows the guard rail 12, the arms 17, and the pivot rods 26, which attach to it, to also move towards the center of the bed. The phantom drawing of FIG. 7 as well as FIG. 9 show the guard rail 12 and the frame 29 in their retracted position.

Thus, the inward translational motion of the guard rail 12 and the frame 29 can proceed only when the guard rail 12 has about reached its lowest position. In this configuration, the leg 54 has raised the latch 78 to uncover the opening 84.

In any other position, the leg 54 can not raise the narrow end 77 of the latch 78, and the wide portion 83 of the latch 78 covers the opening 84. Any attempt to move the guard rail towards the middle of the bed results in the stop pin 85 abutting the wide portion 83 to prevent the ingress of the guard rail 12.

As the guard 12 moves from its upper position to the middle, lowered, and retracted positions, it remains perpendicular to the floor on which the bed sits. It continues to remain perpendicular as it accompanies the foot section in its raising or lowering. Maintaining this constant angle allows it to properly guard a patient when elevated and not require excessive space to lower and retract.

When the foot rail 12 rotates upwards, at both its middle and its uppermost positions the timing link 40 will abut against the underside of the latch 58. However, since the beveled edge of the latch 58 meets the timing link, its upward motion against the cammed beveled edge of the latch 58 forces the latch into the housing 59 so that the guard rail 12 may continue its upward motion unimpeded.

The head side guard 112 has basically the same structure and operates in substantially the same manner as the foot guard 12. However, it elevates by rotating towards the foot of the bed or in the counter-clockwise direction in FIG. 2. This results in timing link also rotating in the counter-clockwise direction as the head guard 112 raises. The head guard 112 also has a cover of plastic pieces 113 and 114 for protection and warmer feel. The bolts 115 hold these in place.

The head guard 112 differs from the foot guard 12 in that it also holds control switches for the patient to change the bed's configuration. To allow for the installation and repair of the electric controls, the end 116 separates from the loop 13. The two bolts 117 hold the end 116 to the loop 113. The actual switches 118 fit into the plastic switch housing 119 where the switch clamp 120 holds them. The clamp 120 remains fixed to the switch housing 119 by the three screws 121. After placing the switches 119 and the clamp 120 into the switch housing 119, the housing 119 then fits onto loop end 116 which is subsequently slid into the open ends of the loop 13 and bolted. The shoulders 122 of the loop 13 abut against the ends 123 of the switch housing 119 and hold it in place.

The cable 130 which connects to the switches 118 travels along the loop 13. It passes through openings in the side of the bushing 131, the sintered bronze bushings 21, and the middle of the hollow bolt 132, exiting through the opening 133. The cable then passes down along the arm 134 and into and through the hollow pivot rod 135. The cable cover 136, held in place by the bolts 137, protects the cable 130 in its journey from the opening 133 in the bolt 132 to the hollow pivot rod 135. After exiting from the pivot rod 135, the spring sheath 137 protects the cable until it reaches the plug 138. The remaining parts on the guard operates the same as with the foot guard 12.

Accordingly, what is claimed is:

1. In a guard structure for a bed having:

A. body restraining means for preventing unintended egress of an occupant from said bed, said restraining means being movable between an elevated and a lowered position;

B. retaining means coupled to said restraining means for holding said restraining means in an elevated position; and C. release means coupled to said retaining means for disengaging said retaining means and allowing said restraining means to descend, the improvement comprising moving means for permitting said restraining means to move between an inner limit toward the center and an outer limit away from the center of a bed to which affixed, said moving means prohibiting motion toward the center of said bed beyond a predesignated point located between said inner and outer limits when said restraining means occupies a position substantially above said lowered position.

2. The improvement of claim 1 wherein:

a. said predesignated point is substantially at said outer limit, and b. said inner limit is located sufficiently close to the center of said bed that said restraining means, when moved to said inner limit, is situated substantially beneath the mattress support of said bed.

3. The improvement of claim 2 wherein said restraining means is substantially rigid and further including intermediate holding means for holding said restraining means at a position intermediate said elevated and said lowered positions.

4. The improvement of claim 2 in a structure for affixation to a bed having electrical facilities wherein said restraining means includes controls for said electrical facilities.

5. The improvement of claim 4 wherein said moving means maintains said restraining means at a constant angle with respect to the surface on which said bed sits.

6. The improvement of claim 5 wherein:

a. said moving means includes separate guiding means having an operative position where it prohibits motion of said restraining means from said outer limit toward said inner limit and an inoperative position where it allows such motion;

b. said restraining means is pivotally attached to each of two arms;

c. said arms each attach to and rotate about an axis passing through a pivot pin;

d. a timing arm connects to each pivot pin;

e. a timing link connects to both timing arms and undergoes motion as said restraining means lowers or elevates; and f. when said restraining means substantially reaches said lowered position, said timing link abuts and moves said guiding means from its operative position to its inoperative position to allow said restraining means to move toward said inner limit.

7. The improvement of claim 6 wherein said guiding means includes two members abutting against each other when said restraining means is at said outer limit and not substantially at said lowered position, said timing link moving at least one of said members out of abutment with the other member when said restraining means is substantially at said lowered position.

8. In a guard structure for a bed having electrical facilities, said structure having body restraining means for preventing unintended egress of an occupant from said bed, the improvement wherein said restraining means includes controls for said electrical facilities.

9. The improvement of claim 8 in a bed having at least one electrical motor to alter the configuration of said bed wherein said controls include means to activate said motor.

10. The improvement of claim 9 wherein said restraining means is movable between an elevated and a lowered position.

11. The improvement of claim 10 wherein said structure includes moving means for permitting said restraining means to move, between inner and outer limits, towards and away from the center of said bed.

* * * * *